(12) United States Patent
Bulmer

(10) Patent No.: US 9,083,158 B2
(45) Date of Patent: Jul. 14, 2015

(54) RESTRICTED BREATHING ENCLOSURE

(75) Inventor: James H. Bulmer, Sherwood Park, CA (US)

(73) Assignee: Zone 2 Controls Ltd., Sherwood Park, Alberta (CA)

( * ) Notice: Subject to any disclaimer, the term of this patent is extended or adjusted under 35 U.S.C. 154(b) by 394 days.

(21) Appl. No.: 13/605,809

(22) Filed: Sep. 6, 2012

(65) Prior Publication Data

US 2014/0063736 A1    Mar. 6, 2014

(51) Int. Cl.
*H05K 7/20* (2006.01)
*F25B 21/04* (2006.01)
*H02B 1/28* (2006.01)
*H02B 1/56* (2006.01)

(52) U.S. Cl.
CPC ... *H02B 1/28* (2013.01); *H02B 1/56* (2013.01)

(58) Field of Classification Search
CPC .......... H02B 1/54; H02B 13/035; H02B 1/00; H01L 9/342
See application file for complete search history.

(56) References Cited

U.S. PATENT DOCUMENTS

| 5,621,614 | A | 4/1997 | O'Neill |
| 8,427,184 | B2 * | 4/2013 | Kan .......................... 324/754.11 |
| 2010/0288467 | A1 | 11/2010 | Manahan et al. |
| 2011/0203296 | A1 | 8/2011 | Orlowski |

FOREIGN PATENT DOCUMENTS

| CN | 201540018 | 8/2010 |
| EP | 0389407 | 9/1990 |

OTHER PUBLICATIONS

Downloaded pages from Expo Technologies of Surry website: http://www.expoworldwide.com/enclosures/restricted-breathing-enclosures/restricted-breathing-enclosures/; Jul. 31, 2012.
Downloaded pages from Laird Technologies website: http://lairdtech.thomasnet.com/viewitems/thermoelectric-modules-2/-series-peltier-solid-state-thermoelectric-coolers?&bc=100|300|1624|3001688; downloaded on Jul. 31, 2012.
Downloaded pages from Hoffman Manufactures website: http://www.hoffmanonline.com/product_catalog/product_detail.aspx?cat_1=34&cat_2=159987&cat_3=163456&catID=163456&itemID=3032; downloaded on Jul. 31, 2012.
Downloaded pages from R. Stahl website: http://www.rstahl.com/products-and-systems/components-for-system-solutions/components-for-use-in-ex-e-enclosures/circuit-breakers.html?tx_cronstahlproducts_pi[view]=product&tx_cronstahlproducts_pi[product_id]=5987&cHash=b370bbb12d2552a92cf4251ed44aaaa7; downloaded on Jul. 31, 2012.
Downloaded pages from Hubbell Killark website: Sealed Coupling; http://www.hubbell-killark.com/; downloaded on Jul. 31, 2012.
Bossed, John A.: Hazardous Locations, Third Edition, CSA International, 2001; p. 109-110.
CAN/CSA C22.2 No. 60079-15:12, National Standard of Canada, Updated Jan. 2012; p. 16, 55, 61-67 and 70.

* cited by examiner

*Primary Examiner* — Gregory Thompson
(74) *Attorney, Agent, or Firm* — Anthony R. Lambert

(57) ABSTRACT

An electrical apparatus, comprises a restricted breathing enclosure having an interior cavity, and a temperature regulator having at least an interior sensing portion within the interior cavity, the temperature regulator including a processor responsive to the interior sensing portion to send control signals to a heat transfer portion of the temperature regulator.

12 Claims, 2 Drawing Sheets

RESTRICTED BREATHING ENCLOSURE

TECHNICAL FIELD

The following relates to restricted breathing enclosures.

BACKGROUND

It is sometimes necessary to install electrical equipment in a hazardous location where explosive gas may be present. If the electrical equipment creates a spark when explosive gas is present, an explosion can result. One method to prevent an explosion is to ensure that the explosive gas can never come into contact with the spark. In locations where explosive gas is present very rarely and for short periods, restricted breathing enclosures have been used to keep the explosive gas away from the sparking electrical equipment.

Restricted breathing enclosures may only be used if the average temperature of the air inside the enclosure may rise by a maximum of about 10° C. when compared with the ambient temperature of the air outside the enclosure, when all internal equipment is operating. In a traditional restricted breathing enclosure, the internal temperature rise may be kept below the maximum value only if the internal electrical equipment dissipated very low power. Any power generated by the internal equipment must be conducted through the wall of the enclosure. The rate of heat transfer must equal or exceed the rate of heat dissipation by the internal electrical equipment so that the average internal temperature rises less than the maximum.

Previously, restricted breathing enclosures were not used to enclose circuit breakers in hazardous locations where explosive gas might be present. Instead, other methods of protection such as explosion proof enclosures have typically been used for circuit breakers installed in hazardous locations. Circuit breakers dissipate significant heat, especially when they are operating near their trip point. This heat dissipation made it impractical to transfer the heat from the inside to the outside of the enclosure without exceeding maximum allowable internal temperature rise.

SUMMARY

The present restricted breathing enclosure is designed to alleviate this problem.

In a preferred embodiment, the electrical apparatus comprises a restricted breathing enclosure having an interior cavity; and a temperature regulator having at least an interior sensing portion within the interior cavity, the temperature regulator including a processor responsive to the interior sensing portion to send control signals to a heat transfer portion of the temperature regulator.

In an exemplary embodiment, the interior sensing portion and the heat transfer portion may both comprise a Peltier junction (also known as a thermoelectric module) located within the interior cavity, the Peltier junction being operable in a sensing mode to act as the interior sensing portion and a heat transfer mode to act as the heat transfer portion.

In another embodiment, the heat transfer portion comprises a Peltier junction located within the interior cavity, and the interior sensing portion may be any temperature sensing device.

In a further embodiment, an ambient sensing portion is provided. The ambient sensing portion may be located exterior to the interior cavity. The processor may be responsive to the ambient sensing portion.

The processor may be located exterior to the interior cavity. The Peltier junction may be connected to the processor by electrical conductors that pass through a restricted breathing seal in the restricted breathing enclosure.

In another embodiment, there is a heat producing electrical apparatus within the interior cavity, the heat producing electrical apparatus having leads for connecting into an exterior circuit. The heat producing electrical apparatus may be a circuit breaker. A sealed actuator mechanism may be connected to the circuit breaker for controlling the circuit breaker between an on position and an off position.

The Peltier junction may have a hot side and a cold side. The hot side may be affixed to a wall of the electrical apparatus, and the cold side may be exposed to the interior cavity. An interior heat sink may be provided in the interior cavity to transfer heat from the interior cavity to the cold side of the Peltier junction. An exterior heat sink may be provided exterior from the interior cavity to radiate heat from the hot side.

The restricted breathing enclosure may have steel walls. The interior cavity may be hermetically sealed from the exterior.

These and other aspects of the device and method are set out in the claims, which are incorporated here by reference.

BRIEF DESCRIPTION OF THE FIGURES

Embodiments will now be described with reference to the figures, in which like reference characters denote like elements, by way of example, and in which.

DETAILED DESCRIPTION

Immaterial modifications may be made to the embodiments described here without departing from what is covered by the claims.

Figure 1:
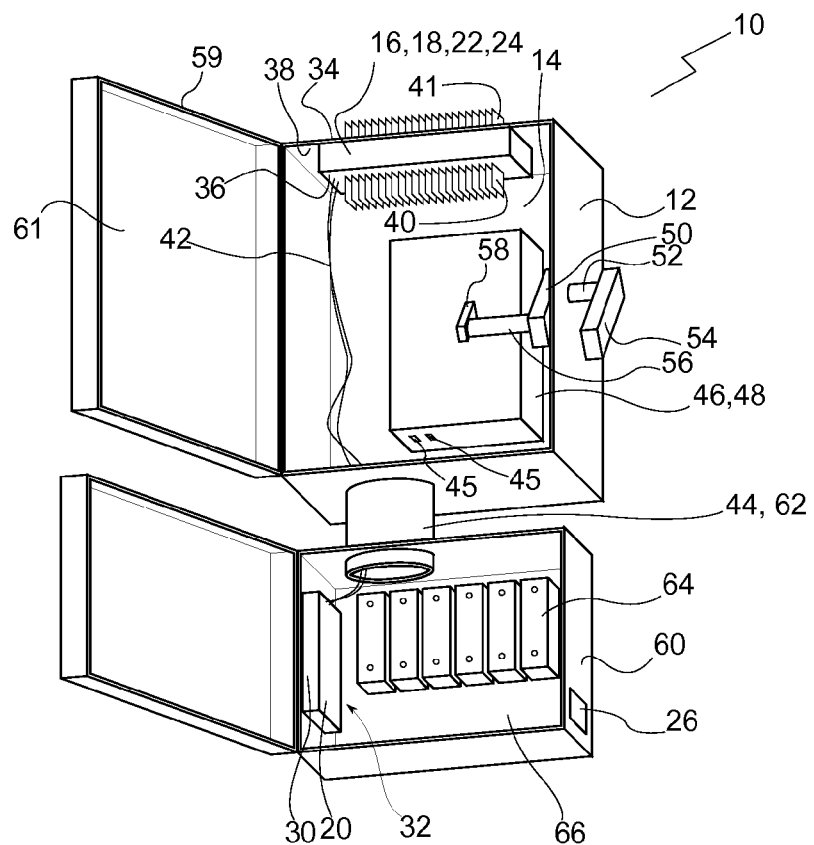
FIG. 1 is a perspective view of an embodiment of a restricted breathing enclosure, in which a Peltier junction comprises an interior sensing portion and a heat transfer portion.

Referring to FIG. 1, an electrical apparatus 10 comprises a restricted breathing enclosure 12 having an interior cavity 14; and a temperature regulator 16 having at least an interior sensing portion 18 within the interior cavity 14, the temperature regulator 16 including a processor 20 responsive to the interior sensing portion 18 to send control signals to a heat transfer portion 22 of the temperature regulator 16. Thus, the temperature of the interior cavity 14 of the restricted breathing enclosure 12 may by actively controlled.

As shown in the embodiment of FIG. 1, the interior sensing portion 18 and the heat transfer portion 22 may both comprise a Peltier junction 24 located within the interior cavity 14. The Peltier junction 24 may be operable in a sensing mode to act as the interior sensing portion 18 and in a heat transfer mode to act as the heat transfer portion 22. An ambient sensing portion 26 may be provided to measure the ambient temperature. The processor 20 may be responsive to the ambient sensing portion 26.

Figure 3:
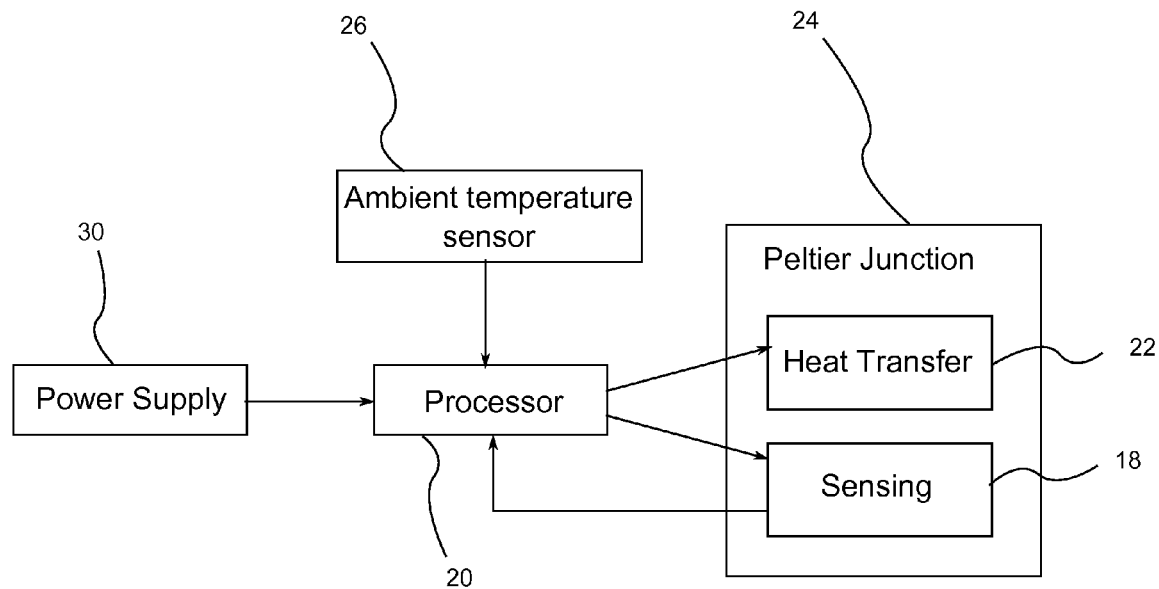
FIG. 3 is a block diagram of a restricted breathing enclosure, in which a Peltier junction comprises an interior sensing portion and a heat transfer portion.

As shown in FIG. 3, a current source 30 may power the processor 20. The ambient sensing portion 26 may send signals to the processor 20. The processor may also send signals to the heat transfer portion 22 and the interior sensing portion 18 of the Peltier junction 24. The interior sensing portion 18 of the Peltier junction 24 may in turn send signals to the processor 20. In some embodiments, when the Peltier junction 24 switches from the heat transfer mode to the heat sensing mode, it may be necessary to wait for the temperature of the external heat sink 41 and the interior heat sink 40 to equalize to the temperature of the ambient air and the interior air, respectively, before taking temperature readings.

Figure 2:
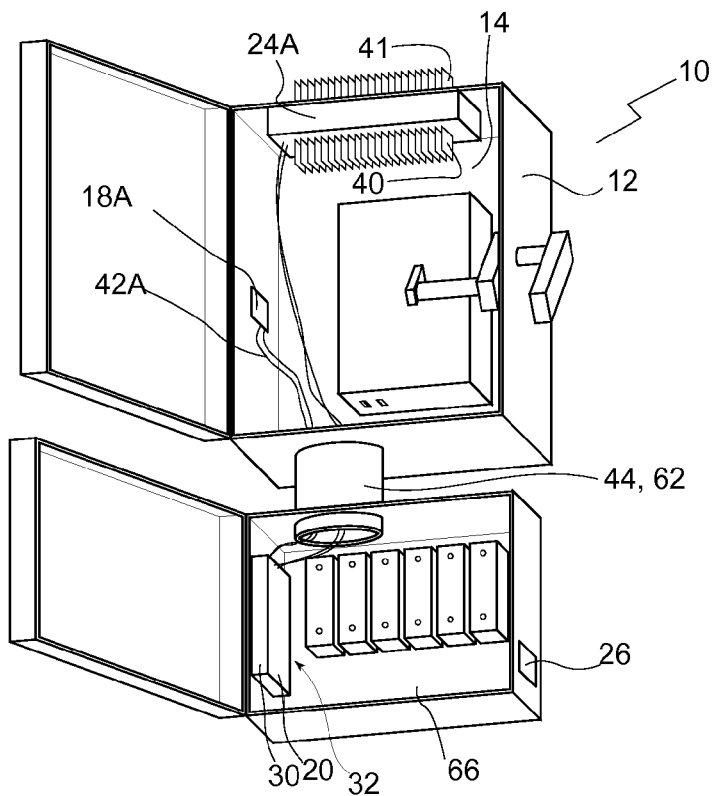
FIG. 2 is a perspective view of a restricted breathing enclosure, in which an interior sensing portion is distinct from a heat transfer portion.

In the embodiment of FIG. 2, the heat transfer portion may comprise a Peltier junction 24A located within the interior cavity 14. The interior sensing portion 18A may be separate from the Peltier junction 24A. The interior sensing portion 18A may be any suitable temperature sensing device, such as a thermistor, a thermocouple, resistance thermometer, or other such means. An ambient sensing portion 26 may be provided to determine ambient temperature. The processor 20 may be responsive to the ambient sensing portion 26.

The processor 20 may use the difference in temperature between the interior cavity (as determined by the interior sensing portion 18 or 18A) and the ambient temperature (as determined by the ambient sensing portion 26) in a feedback control loop to regulate the interior cavity temperature.

Figure 4:
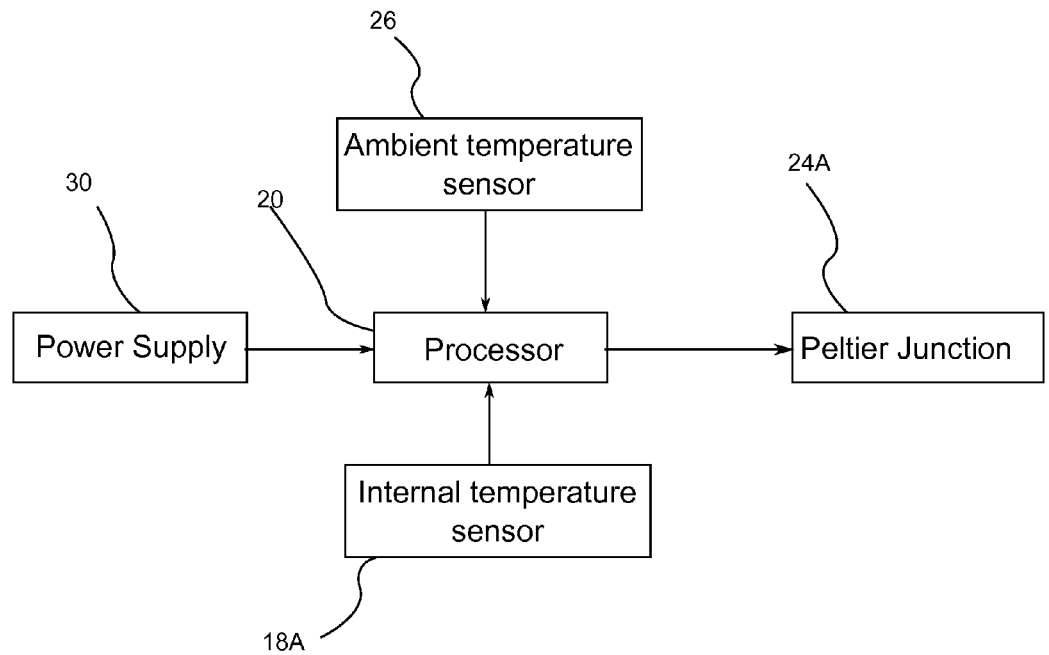
FIG. 4 is a block diagram of a restricted breathing enclosure, in which an interior sensing portion is distinct from a heat transfer portion.

In the embodiment of FIG. 4, both the interior sensing portion 18A and the ambient sensing portion 26 may send signals to the processor 20. The processor may be powered by a current source 30, and the processor 20 may send signals to the Peltier junction 24A.

As in FIGS. 1 and 2, the Peltier junction 24, 24A may be powered by a current source 30. The processor 20 may control the current through the Peltier junction such that the temperature of the air inside the enclosure 12 remains as close to the temperature outside the enclosure 12 as desired and to limit the temperature range within the enclosure 12 within a predefined range, such as may be established by regulation. Both the current source 30 and processor 20 may be provided within a box 32.

In some embodiments such as that of FIG. 1, the Peltier junction 24 may comprise a hot side 34 and a cold side 36. The hot side 34 may be affixed to a wall 38 of the electrical apparatus 10, such that the wall 38 dissipates heat from the hot side 34 of the Peltier junction 24 and radiates it to the air outside the interior cavity 14. In some embodiments it may be necessary to provide an exterior heat sink 41 to radiate heat from the hot side 34. The cold side 36 may be exposed to the interior cavity 14. An interior heat sink 40 may be provided in the interior cavity 14 to transfer heat from the interior cavity 14 to the cold side 36 of the Peltier junction 24, and enhance heat transfer from the internal air to the cold side 36 of the Peltier junction 24.

The processor 20 may be located exterior to the interior cavity 14. The Peltier junction 24 may be connected to the processor by electrical conductors 42 that pass through a restricted breathing seal 44 in the restricted breathing enclosure 12. Similarly, in some embodiments such as in FIG. 2 where the interior sensing portion 18A is distinct from the Peltier junction 24A, the interior sensing portion 18A may be connected to the processor 20 by electrical conductors 42A that pass through the restricted breathing seal 44 in the restricted breathing enclosure 12.

The restricted breathing enclosure 12 may be constructed with steel walls, to enhance heat dissipation and radiation.

Referring to FIG. 1, there may be a heat producing electrical apparatus 46 within the interior cavity 14, the heat producing electrical apparatus 46 having input and output leads 45 for connecting into an exterior circuit. The heat producing electrical apparatus 46 may be a circuit breaker 48.

A sealed actuator mechanism 50 may be connected to the circuit breaker 48 for controlling the circuit breaker between an on position and an off position, in order to open and close the circuit breaker from outside the restricted breathing enclosure without allowing leaking of air into or out of the enclosure 12. The shaft 52 of the sealed actuator mechanism may be sealed with an O ring or a U cup seal, to allow the shaft 52 to move without allowing air to leak along the shaft 52. The shaft 52 may transfer the motion of a handle 54 attached to outside the enclosure 12 to an actuator 56 inside the enclosure 12 to move the on/off lever 58 of the circuit breaker 48.

In a preferred embodiment, the restricted breathing enclosure is hermetically sealed. The seal may in part be created through at least in part a door seal 59 on the door 61 of the restricted breathing enclosure 12. It may be desirable to connect external wires (not shown) to the input and output leads 45 on the circuit breaker 48, without allowing leakage of air into or out of the enclosure 12. This may be accomplished by connecting wires to the leads 45 on the circuit breaker 48 inside the restricted breathing enclosure 12. These wires may be routed to a separate field termination enclosure 60 through a sealed coupling 62 such as a Killark Model ENY-3-T wherein the coupling 62 is completely sealed with epoxy after the wires are routed through, to prevent the leakage of air. The field termination enclosure 60 may contain field terminal blocks 64 such as Weidmuller W Series DIN Rail Terminals. The wires from the restricted breathing enclosure 12 may be connected to one side of the field terminal blocks 64. The external wires may be connected to the other side of the field terminal blocks 64, so that electrical connections may be made from the external wires to the terminals on the circuit breaker 48 without the need to open the restricted breathing enclosure 12. An area 66 may be provided for connecting external field wiring (not shown). Because there are no components in the field termination enclosure 60 that may create a spark under normal conditions, it may not be necessary to keep explosive gas out of the field termination enclosure 60. This method may allow field electricians to install the restricted breathing circuit breaker assembly, without concern for maintaining the seal on the restricted breathing enclosure.

This system of active temperature regulation may allow the heat producing electrical apparatus to dissipate much more power without exceeding maximum allowable temperature rise, compared to a passive system where heat transfer occurs only due to the temperature difference between the air inside the enclosure wall and the ambient air outside.

By installing an active temperature regulator in a restricted breathing enclosure as described herein, it may now be possible to install one or more circuit breakers in a restricted breathing enclosure without violating the maximum temperature rise limitation.

In the claims, the word "comprising" is used in its inclusive sense and does not exclude other elements being present. The indefinite articles "a" and "an" before a claim feature do not exclude more than one of the feature being present. Each one of the individual features described here may be used in one or more embodiments and is not, by virtue only of being described here, to be construed as essential to all embodiments as defined by the claims.

The embodiments of the invention in which an exclusive property or privilege is claimed are defined as follows:

1. An electrical apparatus, comprising:
    a restricted breathing enclosure having an interior cavity, the restricted breathing enclosure configured to restrict the entry of an explosive gas into the interior cavity;
    a heat producing and spark producing electrical apparatus within the interior cavity, the heat producing electrical apparatus having leads for connecting into an exterior circuit; and
    a temperature regulator having at least an interior sensing portion within the interior cavity, the temperature regulator including a processor responsive to the interior sensing portion to send control signals to a heat transfer portion of the temperature regulator, the heat transfer portion comprising a Peltier junction.

2. The electrical apparatus of claim 1 in which the interior sensing portion also comprises the Peltier junction, the Peltier junction being located within the interior cavity, the Peltier junction being operable in a sensing mode to act as the interior sensing portion and a heat transfer mode to act as the heat transfer portion.

3. The electrical apparatus of claim 1 in which the Peltier junction is located within the interior cavity.

4. The electrical apparatus of claim 1 further comprising an ambient sensing portion, the processor being responsive to the ambient sensing portion.

5. The electrical apparatus of claim 1 in which the processor is located exterior to the interior cavity and the Peltier junction is connected to the processor by electrical conductors that pass through a restricted breathing seal in the restricted breathing enclosure.

6. The electrical apparatus of claim 1, in which the heat producing and spark producing electrical apparatus comprises a circuit breaker.

7. The electrical apparatus of claim 6, further comprising a sealed actuator mechanism connected to the circuit breaker for controlling the circuit breaker between an on position and an off position.

8. The electrical apparatus of claim 1, in which the Peltier junction comprises a hot side and a cold side, the hot side being affixed to a wall of the electrical apparatus, and the cold side being exposed to the interior cavity.

9. The electrical apparatus of claim 8, further comprising an interior heat sink in the interior cavity to transfer heat from the interior cavity to the cold side of the Peltier junction.

10. The electrical apparatus of claim 9, further comprising an exterior heat sink exterior from the interior cavity to radiate heat from the hot side.

11. The electrical apparatus of claim 1, the restricted breathing enclosure further comprising steel walls.

12. The electrical apparatus of claim 1, in which the interior cavity is hermetically sealed.

* * * * *